Patented Aug. 11, 1953

2,648,652

UNITED STATES PATENT OFFICE 2,648,652

PLASTICIZED POLYVINYL CHLORIDES

Otto von Schickh, Ludwigshafen (Rhine), and Waldtraut Froese, Weinheim, Bergstrasse, Germany No Drawing. Application March 29, 1951, Serial No. 218,254. In Germany May 4, 1950

4 Claims. (Cl. 260—31.8)

This invention relates to novel compositions comprising plasticized polyvinyl chloride including copolymerization products of vinyl chlorides containing a preponderating amount of polyvinyl chloride.

It is an object of the present invention to provide novel plasticizers which will be compatible with polyvinyl chloride within a wide range yielding plastic rubberlike compositions of excellent electrical and mechanical properties and of high stability towards cold, heat, and light.

We have discovered that carboxylic acid esters of 6-chloro hexanol-1 may be most advantageously used for plasticizing polyvinyl chloride.

The starting material for these esters, 6-chloro hexanol-1, may be prepared by partially esterifying hexandiol-1.6 with hydrochloric acid or by splitting up hexamethylene oxide with hydrochloric acid.

For the esterification of this chloroalkanol we may use a variety of carboxylic acids. Generally speaking, we prefer to have the carboxylic acid contain at least 4 carbon atoms. We may use monocarboxylic acids, e. g. capronic acid, lauric acid, oleic acid and stearic acid and their branched-chain homologues and mixtures of such acids, or cycloaliphatic acids as cyclohexyl carboxylic acid, araliphatic acids, such as phenylacetic acid, hydrocinnamic acid and aromatic acids such as benzoic, alkyl benzoic or naphthoic acid.

We prefer to use dicarboxylic acids for the esterification of the chlorohexanol, in particular saturated aliphatic dicarboxylic acids having from 4 to 10 carbon atoms in a straight chain or their ramified homologues, e. g. succinic, adipic, methyl and dimethyl adipic or sebacic acid, or aliphatic dicarboxylic acids, wherein the carbon chain is interrupted by an oxygen or sulfur atom, e. g. dipropyl ether or thioether dicarboxylic acid. Unsaturated dicarboxylic acids, such as maleic or butene-dicarboxylic acid, may also be used as well as cycloaliphatic dicarboxylic acids, such as cyclohexandicarboxylic or diacetic acid. As will be seen from above, we prefer to have the carboxylic acid groups linked together by an aliphatic chain, in particular by a hydrocarbon radicle of aliphatic character.

The preparation of esters is performed in the conventional manner, for example by heating equivalent amounts of chlorohexanol and the carboxylic acid or its derivatives capable of esterification, if necessary under the addition of a small amount of acid and distilling off of water. The esters may also be prepared by causing carboxylic acid chlorides or anhydrides on hexamethylene oxide.

The incorporation of the esters according to the present invention into the polyvinyl chloride or the polyvinyl chloride containing mixed polymers may be carried out according to the conventional methods, for example by intimately mixing, if necessary at elevated temperature and/or under the addition of solvents or swelling agents. Rolling and kneading, preferably at elevated temperature, are also suitable ways for homogenizing the mixtures. The esters may also be added to aqueous emulsions of the polyvinyl chloride and incorporated therein by heating. Generally speaking, from 10 to 60 per cent of the ester, with reference to the total weight of the plastic may be incorporated. Other substances, such as conventional plastifiers, stabilizing agents, dyestuffs or fillers, may also be added in the formation of the compositions.

The polyvinyl chloride plastified according to this invention may be used for the manufacture of various shaped articles. These are distinguished by a satisfactory toughness, pliability and a good fastness to light. Depending on the field of application it is possible to influence the volatility of the ester serving as plastifier to a certain extent. If polyvinyl chloride articles are desired of high stability towards heat, it is preferable to use such esters wherein the total number of carbon atoms is between 18 and 24, whereas, if high stability to cold is desired, lower molecular esters, e. g. esters having between 8 and 18 carbon atoms, will be preferably employed.

The plastified polyvinyl chloride according to this invention may be used for the manufacture of lacquers and coating compositions. They may also be shaped in the usual manner by casting, rolling, molding, blowing or drawing. Apart from being used in the form of shaped articles, the plastics may also be employed as films, foils, tapes, for adhesives, for coating wood, metal, fabrics or paper, for manufacturing electrical insulations, oil cloth or floor covering materials.

Further details of the invention will be apparent from the following example. The parts are by weight.

*Example*

60 parts of polyvinyl chloride are thoroughly mixed with 40 parts of an adipic acid di-6-chlorohexyl ester by rolling at 160° C. The mass thus obtained is similar to soft vulcanized rubber and distinguished by a high fastness to cold down to —45° C. It may be used for the manufacture of foils and films.

Similar masses are obtained when using from 30 to 50 parts of one of the following esters:

Maleic acid di-6-chlorohexyl ester.
Glutaric acid di-6-chlorohexyl ester.
Methyl adipic acid di-6-chlorohexyl ester.
Sebacic acid di-6-chlorohexyl ester.

What we claim is:

1. A composition of matter comprising polyvinyl chloride plasticized with an aliphatic carboxylic acid ester of 6-chlorohexanol-1.

2. A composition of matter comprising polyvinyl chloride plasticized with an aliphatic dicarboxylic acid diester of 6-chlorohexanol-1, derived from an aliphatic dicarboxylic acid having from 4 to 10 carbon atoms.

3. A composition of matter comprising polyvinyl chloride plasticized with the adipic acid diester of 6-chlorohexanol-1.

4. A composition of matter comprising polyvinyl chloride plasticized with the 6-chlorohexanol-1 ester of a compound from the group consisting of aliphatic dicarboxylic acids having from 4 to 10 carbon atoms in a straight chain and the methyl and dimethyl homologues thereof.

OTTO v. SCHICKH.
WALDTRAUT FROESE.

References Cited in the file of this patent

FOREIGN PATENTS

| Number | Country | Date |
| --- | --- | --- |
| 881,970 | France | Feb. 8, 1943 |